(12) United States Patent
Russell et al.

(10) Patent No.: US 8,659,880 B2
(45) Date of Patent: Feb. 25, 2014

(54) AC PHOTOVOLTAIC MODULE AND INVERTER ASSEMBLY

(75) Inventors: Miles Clayton Russell, Lincoln, MA (US); Gregory Allen Kern, Lafayette, CO (US); Ruel Davenport Little, Concord, MA (US); Zachary Adam King, Townsend, MA (US)

(73) Assignee: Greenray Inc., Westford, MA (US)

( * ) Notice: Subject to any disclaimer, the term of this patent is extended or adjusted under 35 U.S.C. 154(b) by 0 days.

(21) Appl. No.: 13/200,190

(22) Filed: Sep. 20, 2011

(65) Prior Publication Data

US 2012/0147564 A1    Jun. 14, 2012

Related U.S. Application Data

(63) Continuation of application No. 12/468,468, filed on May 19, 2009, now Pat. No. 8,023,266.

(60) Provisional application No. 61/128,219, filed on May 20, 2008.

(51) Int. Cl.
*H05K 7/20* (2006.01)
*H05K 7/14* (2006.01)
*H02M 7/00* (2006.01)

(52) U.S. Cl.
USPC ............. 361/622; 361/679.46; 361/679.54; 361/715; 363/40; 363/71; 363/131; 363/132; 136/244; 136/251

(58) Field of Classification Search
USPC .............. 361/679.46–679.54, 702–714, 361/717–724, 736, 752, 82, 103–106, 605, 361/609, 622–625, 679; 165/80.3, 104.33, 165/185; 174/16 R, 16.3, 252; 363/13, 15, 363/26, 39, 17, 55, 60, 40, 71, 243–246, 363/251, 255, 249, 252, 292, 63–65, 363/73–80; 323/266, 285, 299, 905, 906; 307/11, 31, 43, 64–66, 72, 82, 44, 75, 307/77, 112, 143–148; 52/173.3, 302.1; 324/260, 538; 29/832, 840, 842, 29/890.03; 136/244, 251

See application file for complete search history.

(56) References Cited

U.S. PATENT DOCUMENTS

| | | | |
|---|---|---|---|
| 4,273,107 A | 6/1981 | Methvin | |
| 4,392,009 A | 7/1983 | Napoli | |
| 5,886,890 A * | 3/1999 | Ishida et al. | 363/71 |
| 5,951,785 A | 9/1999 | Uchihashi et al. | |
| 6,111,189 A | 8/2000 | Garvison et al. | |
| 6,307,144 B1 * | 10/2001 | Mimura et al. | 136/244 |
| 6,593,521 B2 | 7/2003 | Kobayashi | |
| 6,654,261 B2 | 11/2003 | Welches et al. | |

(Continued)

FOREIGN PATENT DOCUMENTS

| | | |
|---|---|---|
| DE | 20012131 U1 | 2/2001 |
| WO | 2008108909 A1 | 9/2008 |
| WO | 2009120955 A3 | 10/2009 |

*Primary Examiner* — Michail V Datskovskiy
(74) *Attorney, Agent, or Firm* — Armstrong Teasdale LLP

(57) ABSTRACT

An AC photovoltaic module includes a DC photovoltaic module for converting solar energy to DC electrical power, and an inverter for converting DC electrical power to AC electrical power, the inverter being adapted for connection to a frame portion of the module and being sized and configured, and provided with arrangements of electrical components thereof, to dispense heat from the inverter, whereby to prolong operational life and reliability of the inverter.

23 Claims, 8 Drawing Sheets

(56) References Cited

U.S. PATENT DOCUMENTS

| | | | |
|---|---|---|---|
| 6,670,541 B2 * | 12/2003 | Nagao et al. | 136/251 |
| 6,713,890 B2 | 3/2004 | Kondo et al. | |
| 6,750,391 B2 | 6/2004 | Bower et al. | |
| 6,791,024 B2 | 9/2004 | Toyomura | |
| 6,804,127 B2 | 10/2004 | Zhou | |
| 6,892,370 B2 | 5/2005 | Flohr | |
| 6,897,370 B2 * | 5/2005 | Kondo et al. | 136/243 |
| 6,966,184 B2 | 11/2005 | Toyomura et al. | |
| 7,397,653 B2 | 7/2008 | Taylor | |
| 7,521,914 B2 * | 4/2009 | Dickerson et al. | 323/288 |
| 7,738,228 B2 | 6/2010 | Taylor | |
| 7,768,154 B2 | 8/2010 | Taylor et al. | |
| 7,919,953 B2 * | 4/2011 | Porter et al. | 323/222 |
| 7,952,016 B2 * | 5/2011 | Higuchi et al. | 136/244 |
| 8,300,439 B2 * | 10/2012 | Little et al. | 363/71 |
| 2002/0078991 A1 | 6/2002 | Nagao et al. | |
| 2002/0179140 A1 | 12/2002 | Toyomura | |
| 2002/0186020 A1 | 12/2002 | Kondo et al. | |
| 2003/0111103 A1 * | 6/2003 | Bower et al. | 136/244 |
| 2004/0118446 A1 * | 6/2004 | Toyomura | 136/244 |
| 2004/0157506 A1 * | 8/2004 | Kondo et al. | 439/894 |
| 2006/0124167 A1 | 6/2006 | Fan et al. | |
| 2006/0250828 A1 * | 11/2006 | Taylor | 363/71 |
| 2008/0106921 A1 * | 5/2008 | Dickerson et al. | 363/131 |
| 2008/0283118 A1 | 11/2008 | Rotzoll et al. | |
| 2009/0285005 A1 * | 11/2009 | Gopfrich | 363/132 |
| 2010/0134959 A1 * | 6/2010 | Fife et al. | 361/678 |
| 2010/0147362 A1 * | 6/2010 | King et al. | 136/251 |
| 2010/0246230 A1 * | 9/2010 | Porter et al. | 363/131 |
| 2010/0326490 A1 * | 12/2010 | Tagliareni et al. | 136/244 |
| 2013/0012061 A1 * | 1/2013 | Rotzoll et al. | 439/535 |

* cited by examiner

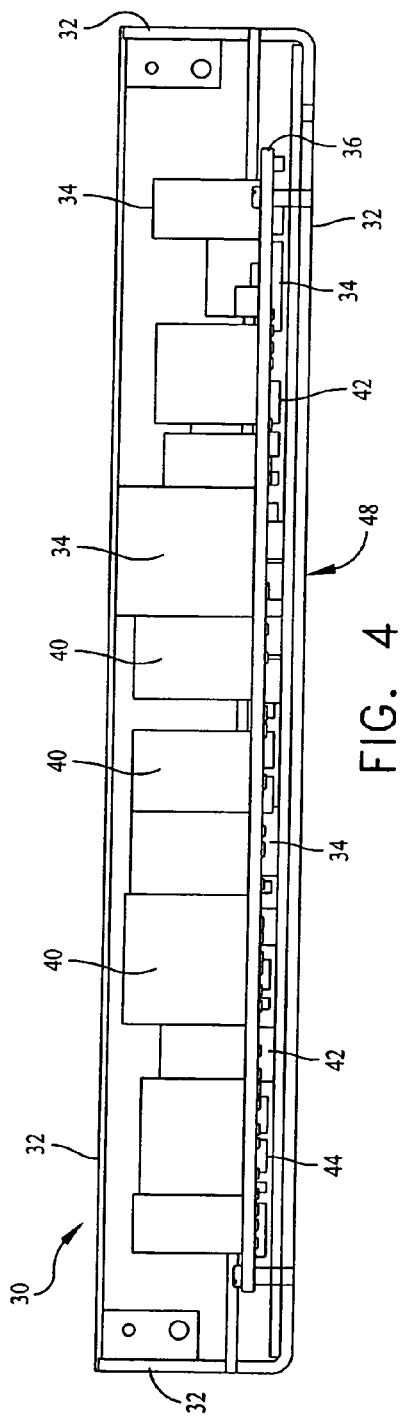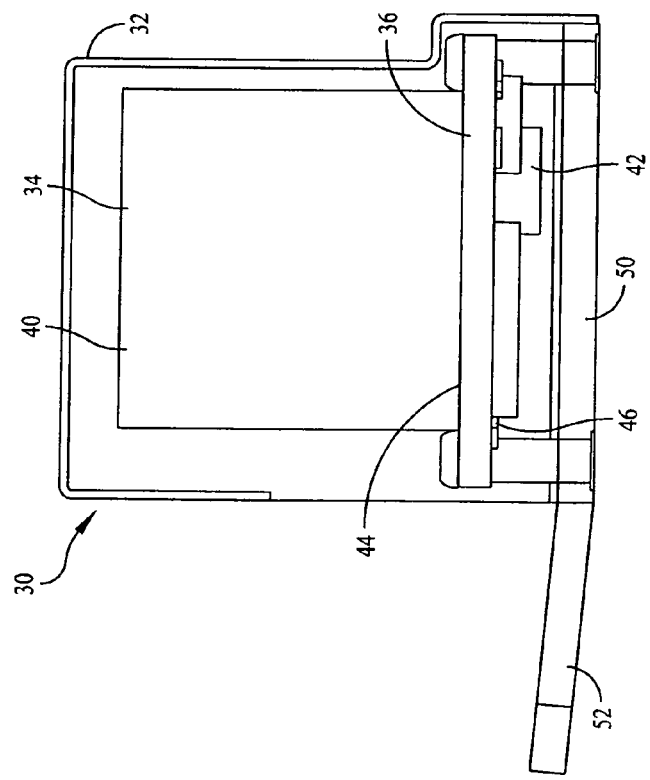

AC PHOTOVOLTAIC MODULE AND INVERTER ASSEMBLY

REFERENCE TO PENDING PRIOR PATENT APPLICATIONS

This patent application is a continuation of prior U.S. patent application Ser. No. 12/468,468, filed May 19, 2009 now U.S Pat. No. 8, 023,266 by Miles Clayton Russell et al. for AN AC PHOTOVOLTAIC MODULE AND INVERTER ASSEMBLY, which in turn claims benefit of prior U.S. Provisional Patent Application Ser. No. 61/128,219, filed May 20, 2008 by Miles Clayton Russell et al. for HIGH-RELIABILITY INVERTER FOR AN AC MODULE.

The above-identified patent applications are hereby incorporated herein by reference.

BACKGROUND OF THE INVENTION

1. Field of the Invention

This invention relates to solar electric power systems, and more particularly to an AC photovoltaic module including an inverter sized and configured so as to collect less heat, and to dissipate heat, and to operate under relatively cool conditions.

2. Description of the Prior Art

It is known to provide an AC photovoltaic module including a DC photovoltaic module for converting solar energy to DC electrical energy, and an inverter for converting the DC electrical energy to AC electrical energy, and for feeding the AC electrical energy to an AC grid. See, for example, International Patent Application No. PCT/US2009/038547.

The inverter typically is mounted at or near the center of the DC photovoltaic module. It is known that the center of the DC module suffers the greatest elevation of heat during a sunny day, and after the sun has lowered and disappeared, the greatest change in temperature.

The extremes of temperatures of the inverter lead to a relatively short life span of the inverter. Inasmuch as each AC module is provided with an inverter, keeping all inverters active in an array of numerous modules can be problematic.

An object of the invention is therefore to provide an AC photovoltaic module having an inverter of a beneficial size and configuration, and mounted on the DC photovoltaic module at a relatively cool peripheral portion of the DC module.

A further object of the invention is to provide an arrangement of components in the inverter such as to concentrate heat in the inverter on one side thereof, and to provide heat sink means for dissipating the heat from that side to the surrounding environment.

A still further object of the invention is to provide film capacitors in the inverter circuitry, which operate more reliably and more effectively, with less internal resistance, and therefore generally less heat, than the same assembly circuitry with commonly used electrolytic capacitors.

SUMMARY OF THE INVENTION

With the above and other objects in view, a feature of the present invention is the provision of an AC photovoltaic module including a DC photovoltaic module for converting solar energy to DC electrical power, and an inverter for converting DC electrical power to AC electrical power, the inverter being adapted for connection to a peripheral frame portion of the DC photovoltaic module and being sized and configured to dispense heat therefrom, to prolong operational life and reliability of the inverter.

In accordance with a further feature of the invention, there is provided an AC photovoltaic module comprising a DC photovoltaic module for producing DC electrical power, and an inverter for converting the DC electrical power to AC electrical power, wherein the inverter is mounted on the DC photovoltaic module, and wherein the inverter comprises a narrow elongated body mounted proximate an outer edge of the DC photovoltaic module, such that an elongated side of the inverter is fixed in abutting relationship to the outer edge of the DC photovoltaic module.

In accordance with a further feature of the invention, there is provided an AC photovoltaic module comprising a DC photovoltaic module for producing DC electrical power, and an inverter for converting the DC electrical power to AC electrical power, the inverter having film capacitor means therein for storing and releasing electrical energy, and the inverter being mounted on the DC photovoltaic module proximate an edge of the DC photovoltaic module.

In accordance with a still further feature of the invention, there is provided an inverter assembly for converting a DC electric power input to an AC electrical power output, the inverter assembly comprising means for receiving the DC electrical power from a DC power source, one or more film capacitors for filtering input current switching ripple of a DC/DC converter, the DC/DC converter being adapted to convert input voltage from the DC power source to voltage suitable for a DC/AC inverter, a second set of one or more film capacitors for filtering switching ripple output of the DC/DC converter and input switching ripple of the DC/AC inverter, the DC/AC converter being adapted to convert DC power to AC current and feed the AC current into an AC power grid.

In accordance with a still further feature of the invention, there is provided an inverter assembly comprising means for receiving DC electrical power from a DC power source, a DC/AC inverter adapted to convert the DC electrical power to AC electrical power, and a set of one or more film capacitors for (a) filtering switching ripple of input current to the DC/AC inverter, and for (b) filtering energy difference between the inverter DC input power and the inverter AC output power, and the DC/AC inverter being adapted to feed AC current into an AC power grid.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings, and wherein:

FIG. 4 is a length-wise cross-sectional view of the inverter of FIG. 3;

FIG. 5 is a width-wise cross-sectional view of the inverter of FIG. 4;

DESCRIPTION OF THE PREFERRED EMBODIMENTS

Figure 1:
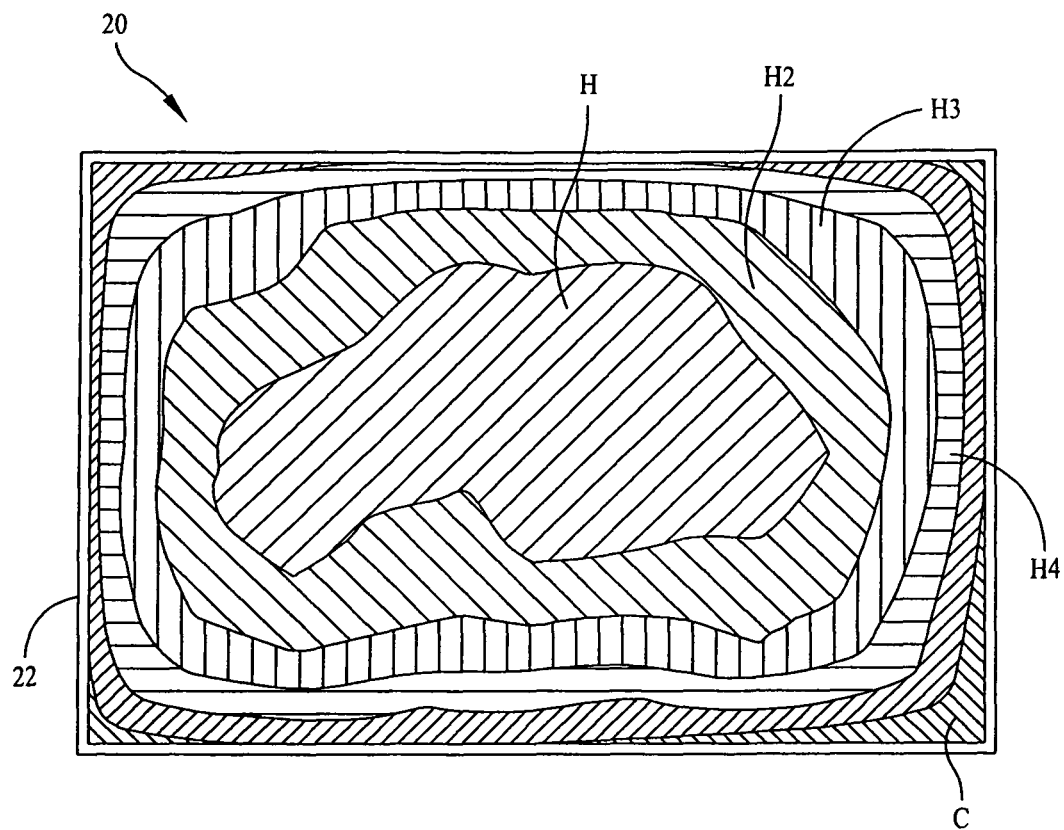
FIG. 1 is a plan view of a framed photovoltaic module, illustrating typical gradients of heat exhibited by a module subjected to sunlight.

Referring to FIG. 1, it will be seen that a DC photovoltaic module 20 illuminated by sunlight, and in the absence of air flow, will exhibit gradients of heat, with a hottest area H appearing in a generally central area of the module. Extending outwardly from the central area are progressively cooler areas, H2, H3, H4, and a coolest area C at an outermost edge of the module which is typically bounded by a frame 22.

At sunless times, and particularly at night time, the module 20 can cool to ambient, and below ambient, temperatures with the central area of the module experiencing the greatest temperature drop. Such change in temperature, particularly over an extended time, is conducive to condensation occurring in the module, which can lead to freeze-thaw mechanized stress in the unit, corrosion, and/or loss of insulation resistance. Accordingly, the most beneficial location for an inverter is proximate the frame 22, that is, in an area well removed from the central area of the module 20.

Figure 2:
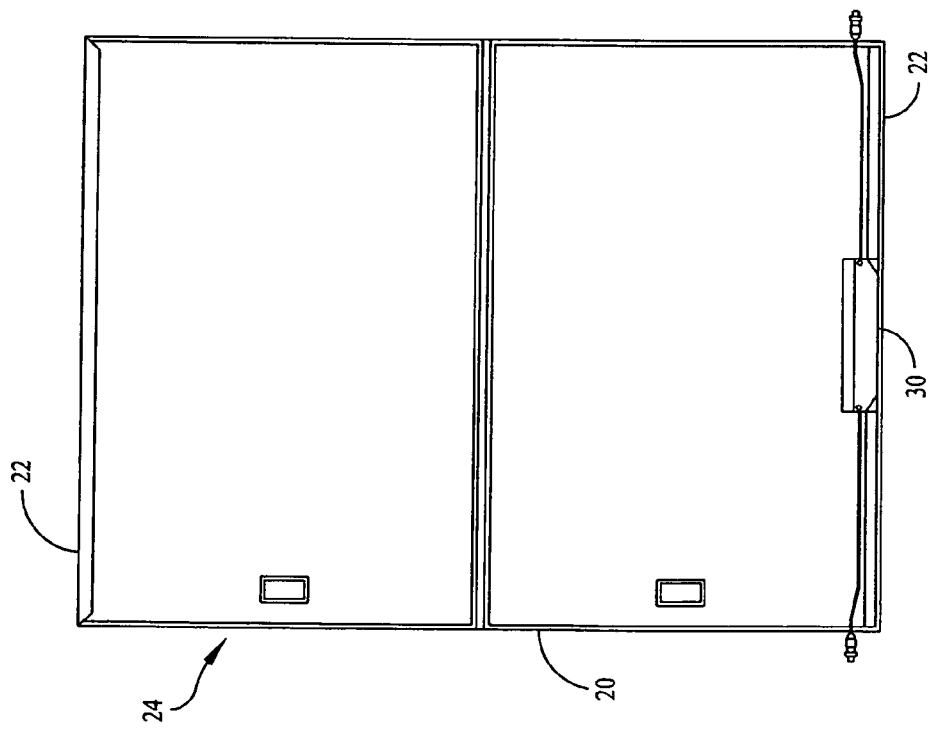
FIG. 2 is a back dimensional view of an AC photovoltaic module, including an inverter mounted on a frame portion of the module.

As shown in FIG. 2, an AC photovoltaic module 24 includes a DC photovoltaic module 20 and an inverter 30, the DC module converting solar energy to DC electrical power, and the inverter converting DC electrical power to AC electrical power.

Figure 3:
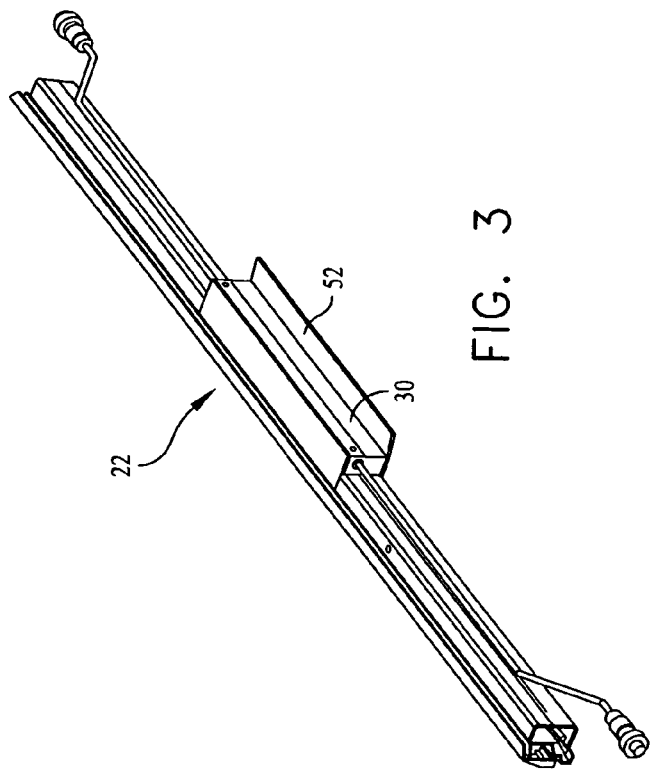
FIG. 3 is a perspective view of a frame portion of a photovoltaic module with an inverter fixed thereto.

Referring to FIGS. 2 and 3, it will be seen that in accordance with the invention an inverter 30 is provided which is mechanically attachable to the frame member 22.

The inverter 30 is of a narrow elongated configuration, such that throughout the length of the inverter, the inverter is disposed in the coolest area C of the DC module 20. Further, the inverter 30 is mounted on a back portion of the frame 22 so as to be out of direct sunlight. Still further, the inverter is spaced from the back of the solar cells of the module 20.

The frame 22 is typically of metal, usually aluminum, which provides a heat sink for the inverter 30 mounted thereon. Thus, heat from the inverter is transferred throughout the frame 22 which, in turn, is located in the coolest region of the module 20.

The narrow, elongated configuration of the inverter 30, typically about 12 inches in length and 2×2 inches in cross-section, permits an extended inverter-to-frame contact surface so that heat is readily transferred to the frame and much less likely to build up in the inverter.

Referring to FIG. 4, it will be seen that the inverter 30 comprises a housing 32 in which is disposed a series of electrical components 34 known in the art. The electrical components 34 are mounted on an elongated circuit board 36 extending throughout most of the length of the housing 32.

Within the inverter housing 32, the electrical components 34 are disposed in a manner facilitating the removal of heat from the inverter. With that in view, the cooler and taller components 40, such as inductors and capacitors are mounted on a first side 44 of the circuit board 36, while heat-producing and shorter components 42, such as diodes and transistors, are mounted on a second side 46 of the circuit board 36.

Thus, as seen in FIGS. 4 and 5, the heat-producing components 40 are necessarily disposed proximate a wall 48 of the housing 32, the wall 48 thereby serving as a heat sink for dissipation of heat generated internally of the inverter 30.

Figure 6:
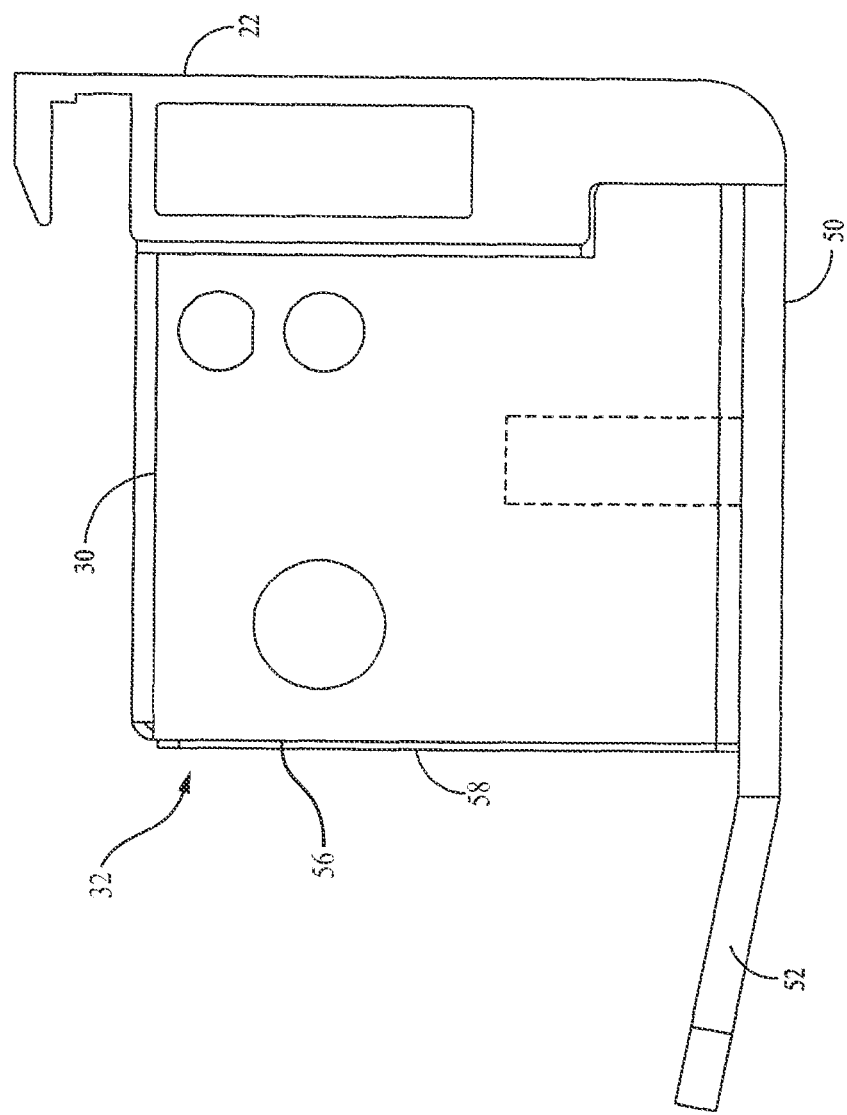
FIG. 6 is an end view of an inverter mounted on a frame member, and a heat sink in the form of a plate fixed to the inverter and extending therefrom, and in phantom shows an optional heat sink feature.

To further expedite the removal of heat from the inverter 30, there may be provided in addition to, or instead of the housing wall 48, an inverter heat sink 50 (FIG. 5) for conveying heat from inside the inverter housing 32 to the surrounding environment. The heat sink 50 may be provided with a plate portion 52 (FIGS. 3 and 6) extending outwardly from the inverter housing 32, and/or may be provided with a portion 54 (FIG. 6) extending from the heat sink 50 into the housing 32 proximate the "hot" components 42.

The heat sink 50 preferably is of aluminum and of a thickness of about 0.125 inch.

To still further expedite the removal of heat from the inverter 30, the wall 56 of the inverter housing 32, which faces away from the module frame 22, may be provided with a highly emissive coating or treatment 58 (FIG. 6) to increase radiative heat transfer from the inverter.

To still further expedite the removal of heat from the inverter 30, the cavity of the inverter may be filled with pottant, which provides heat transfer away from the hot components. In addition, the pottant provides thermal mass which limits temperature excursions of the hot components and the rate of change of the thermal components under varying generation of the DC source.

There is thus provided an inverter which, by nature of its size and configuration and location, and the arrangement of its internal components, provides a longer life cycle than was heretofore customary.

Another avenue by which to extend the life of the inverter is to avoid the use of historically troublesome electronic components. The most vulnerable component at present is the state-of-the-art electrolytic capacitor, which is inexpensive and adapted to store a relatively large amount of energy, but is known to deteriorate in a typical AC module environment of high temperature, temperature cycling, and voltage spikes.

Figure 7:
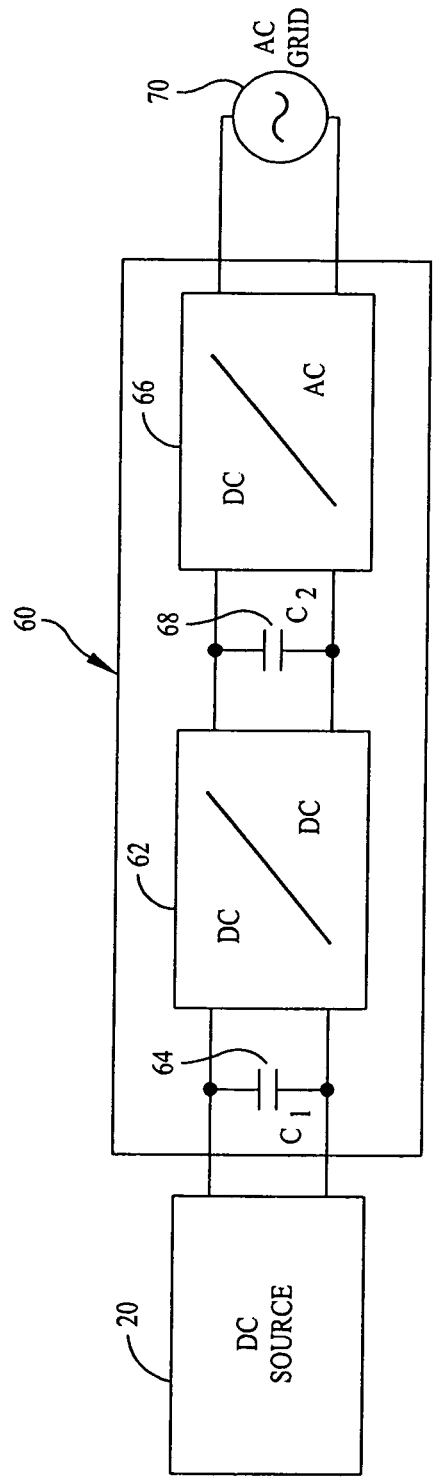
FIG. 7 is a diagrammatic view of an inverter adapted to receive DC electrical current from a DC source and to provide AC electrical current to an AC grid.
Figure 8:
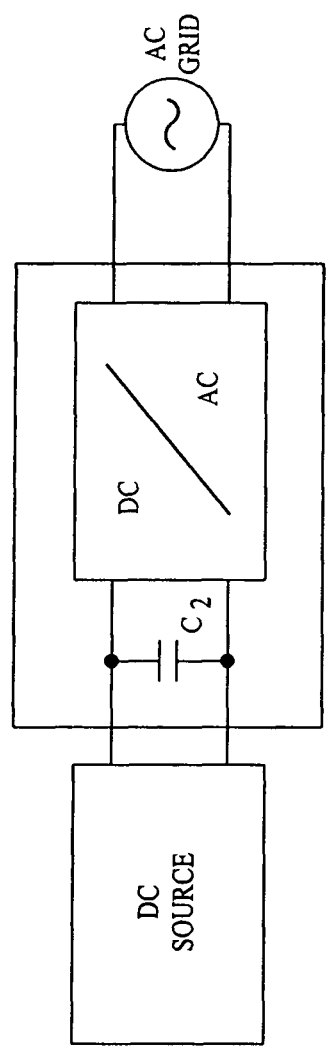
FIG. 8 is a diagrammatic view of an alternative inverter adapted to receive DC electrical current from a DC source and to provide AC electrical current to an AC grid.

In FIG. 7, there is shown an inverter 60 in electrical communication with a DC source, which may be a DC photovoltaic module, wind, hydro, battery, fuel cell, or the like. Between the DC source and the DC/DC converter 62 is a capacitor 64, used to filter the input current switching ripple of the DC/DC converter 62. The DC/DC converter 62 converts the input voltage from the source to a voltage level suitable for a DC/AC inverter 66. Between the DC/DC converter 62 and the DC/AC inverter 66 is a further capacitor 68, for filtering the switching ripple output of the DC/DC converter 62 and the input switching ripple of the DC/AC inverter 66.

Figure 9:
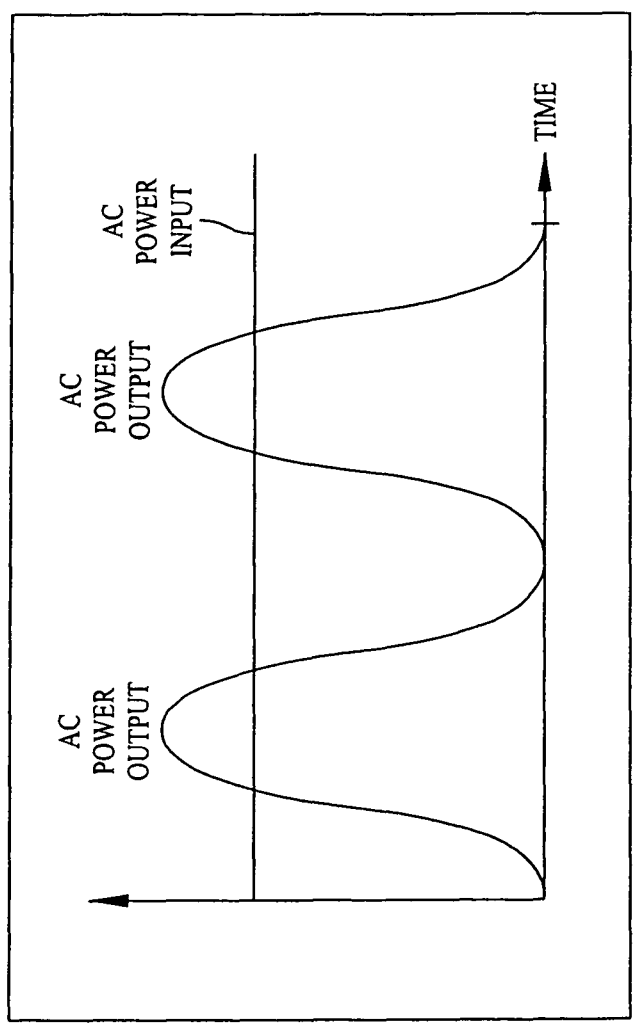
FIG. 9 is a graphical illustration of DC input power, constant with time, and AC output power pulses.
Figure 10:
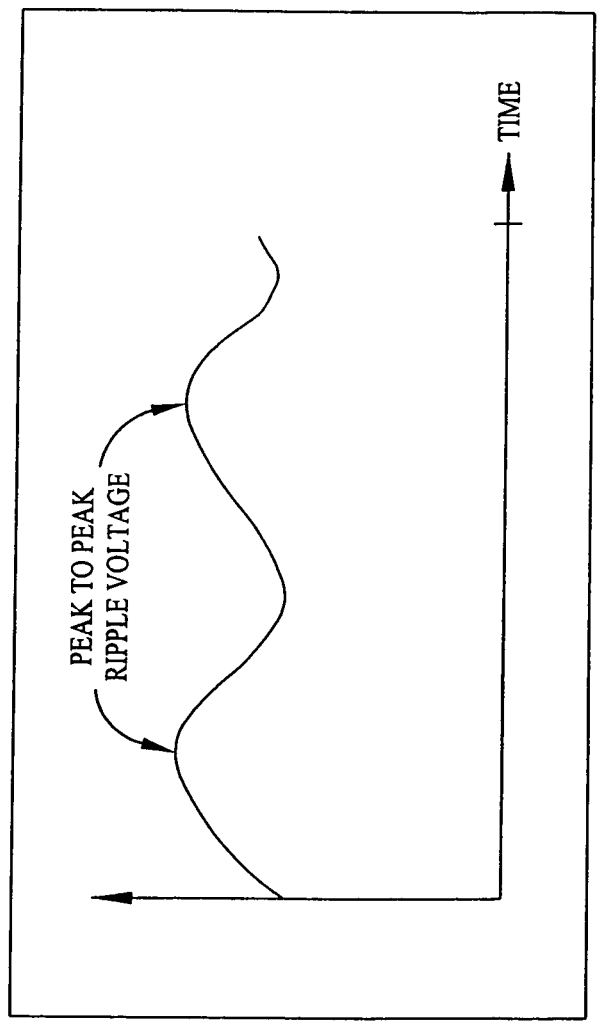
FIG. 10 is a graphical illustration showing ripple voltage that typically appears on an energy storage capacitor over time.

The capacitor 68 may also be used as a main energy storage element to make up for any difference in input DC power and output AC power as a function of time; refer to FIGS. 9 and 10.

The DC/AC inverter 66 converts a DC voltage to an output AC current which is injected into an AC power grid 70. In the AC power grid 70, voltage is typically regulated by a utility or a local generation facility.

As noted above, the DC source may be a photovoltaic module 20. The capacitor 64 is a film capacitor for filtering the input current ripple of the DC/DC converter 62. The DC/DC converter 62 is a full bridge converter. The capacitor 68 stores the difference in energy input from the DC input to the AC output. This difference in energy causes a ripple voltage to appear on capacitor 68. The ripple voltage on capacitor 68 is sinusoidal under ideal operating conditions, at twice the frequency of the AC grid 70.

The DC/AC inverter 66 is a full bridge inverter operated in discontinuous conduction mode. The DC/AC inverter 66 is operated such that the output current is a controlled low (5%) total harmonic distortion current wave-form. The AC grid 70 is a 120 volt 60 Hertz AC circuit.

It will be understood that many changes in the details, materials, steps and arrangements of parts, which have been herein described and illustrated in order to explain the nature of the invention, may be made by those skilled in the art within the principle and scope of the invention as explained in the appended claims.

What is claimed is:

1. An AC photovoltaic module comprising:
    a DC photovoltaic module for producing DC electrical power, the DC photovoltaic module including a frame member, and having a front portion and a back portion; and
    an inverter for converting the DC electrical power to AC electrical power, the inverter having a substantially rectangular shape including two long sides, wherein said inverter is mounted on the back portion of said DC photovoltaic module with one of the long sides proximate the frame member, the inverter having an inverter housing and a heat sink including a fixed plate extending outwardly from said inverter housing.

2. The AC photovoltaic module in accordance with claim 1, wherein said inverter is in thermal communication with said frame member.

3. The AC photovoltaic module in accordance with claim 2 wherein said frame member is of metal.

4. The AC photovoltaic module in accordance with claim 3 wherein said metal is at least in part aluminum.

5. The AC photovoltaic module in accordance with claim 2 wherein said inverter is attached to said frame member.

6. The AC photovoltaic module in accordance with claim 1 wherein said inverter is mounted to said DC photovoltaic module such that one of the long sides of said inverter is fixed in abutting relationship to said frame member.

7. The AC photovoltaic module in accordance with claim 1 wherein said inverter comprises a circuit board extending substantially throughout a length of said inverter.

8. The AC photovoltaic module in accordance with claim 7 wherein said inverter comprises a plurality of electrical components mounted on said circuit board.

9. The AC photovoltaic module in accordance with claim 8 wherein said plurality of electrical components comprises a plurality of heat producing electrical components, and wherein substantially all of the plurality of heat-producing components are mounted on a first side of said circuit board.

10. The AC photovoltaic module in accordance with claim 9 wherein said heat producing components comprise at least diodes and transistors.

11. The AC photovoltaic module in accordance with claim 9 wherein said heat sink is proximate to said heat-producing components.

12. The AC photovoltaic module in accordance with claim 8 wherein said inverter housing substantially enclosing said circuit board and said plurality of electrical components.

13. The AC photovoltaic module in accordance with claim 11 wherein said heat sink forms at least a portion of said inverter housing enclosing said heat-producing components.

14. The AC photovoltaic module in accordance with claim 12 wherein said inverter housing is substantially filled with pottant, and said circuit board and said plurality of electrical components are embedded in said pottant.

15. The AC photovoltaic module in accordance with claim 6 wherein a length of said inverter is about twelve inches.

16. An AC photovoltaic module comprising:
    a DC photovoltaic module for producing DC electrical power, said DC photovoltaic module having a front surface and a rear surface; and
    an inverter for converting the DC electrical power to AC electrical power, said inverter comprising a film capacitor for storing and releasing electrical energy, and said inverter being mounted adjacent the rear surface of said DC photovoltaic module with at least one side of said inverter proximate an edge of said DC photovoltaic module, the inverter having an inverter housing and a heat sink including a fixed plate extending outwardly from said inverter housing.

17. An AC photovoltaic module in accordance with claim 16 wherein said inverter comprises:
    an elongated circuit board disposed in said housing;
    wherein said film capacitor is electrically connected on a side of said circuit board.

18. An AC photovoltaic module in accordance with claim 17 wherein said circuit board is disposed proximate an outer wall of said inverter, and the heat sink is fixed to said inverter outer wall for carrying heat away from said inverter.

19. The AC photovoltaic module in accordance with claim 16 wherein said plate is at least in part of heat conductive metal.

20. The AC photovoltaic module in accordance with claim 17 wherein said circuit board and said film capacitor are embedded in a pottant.

21. The AC photovoltaic module in accordance with claim 1 wherein at least one side of said inverter is provided with at least one of a highly emissive coating and a treatment to provide for improved heat transfer from said inverter.

22. The AC photovoltaic module in accordance with claim 9 wherein said circuit board includes a second side opposite the first side of said circuit board.

23. The AC photovoltaic module in accordance with claim 22, wherein the second side of said circuit board is disposed adjacent the back portion of said DC photovoltaic module.

* * * * *